United States Patent
Dreischarf et al.

(10) Patent No.: US 10,393,147 B2
(45) Date of Patent: Aug. 27, 2019

(54) FAN CASING ASSEMBLIES AND METHOD OF MOUNTING A COOLER TO A FAN CASING

(71) Applicant: Unison Industries, LLC, Jacksonville, FL (US)

(72) Inventors: Derek Thomas Dreischarf, Bellbrook, OH (US); Bernard Albert Luschek, Lebanon, OH (US); Walter Arthur Hundley, Enon, OH (US)

(73) Assignee: Unison Industries, LLC, Jacksonville, FL (US)

( * ) Notice: Subject to any disclaimer, the term of this patent is extended or adjusted under 35 U.S.C. 154(b) by 912 days.

(21) Appl. No.: 14/807,046

(22) Filed: Jul. 23, 2015

(65) Prior Publication Data
US 2017/0023017 A1  Jan. 26, 2017

(51) Int. Cl.
*F04D 29/58* (2006.01)
*F28F 9/007* (2006.01)
(Continued)

(52) U.S. Cl.
CPC ........... *F04D 29/582* (2013.01); *B64D 29/00* (2013.01); *B64D 33/02* (2013.01); *B64D 33/08* (2013.01); *F01D 25/28* (2013.01); *F02C 7/04* (2013.01); *F02C 7/14* (2013.01); *F02C 7/32* (2013.01); *F02K 3/06* (2013.01); *F04D 19/002* (2013.01);
(Continued)

(58) Field of Classification Search
CPC ...... F02C 7/12; F02C 7/14; F02C 7/32; F02C 7/20; F02C 7/04; B64D 29/06; B64D 2033/024; B64D 33/02; B64D 33/08; F01D 25/28; F01D 25/24; F01D 25/243; F01D 25/246; F02K 3/04; F02K 3/115; F05D 2260/213; F28D 2021/0049; F28D 2021/0021; F28F 9/007; F28F 9/0075;
(Continued)

(56) References Cited

U.S. PATENT DOCUMENTS 4,676,715 A * 6/1987 Imbault ................ F01D 25/246
                                                         415/116
4,773,227 A * 9/1988 Chabis .................... F23R 3/002
                                                         60/752

(Continued)

FOREIGN PATENT DOCUMENTS

EP    1898069 A2    8/2007
EP    1916399 A2   10/2007
(Continued)

OTHER PUBLICATIONS

European Search Report and Opinion issued in connection with corresponding EP Application No. 16180782.1 dated Dec. 23, 2016.

*Primary Examiner* — Gerald L Sung
*Assistant Examiner* — Alain Chau
(74) *Attorney, Agent, or Firm* — General Electric Company; Pamela A. Kachur

(57) ABSTRACT

A fan casing assembly for a turbine engine including a fan casing having a peripheral wall, a surface cooler having a first surface confronting the peripheral wall and forward and aft projections, which are radially spaced from the first surface and located between the peripheral wall and the first surface, and a mounting bracket to mount the surface cooler to the fan casing and a method of mounting a surface cooler to a fan casing of a turbine engine.

13 Claims, 6 Drawing Sheets

(51) Int. Cl.
| | |
|---|---|
| *F01D 25/28* | (2006.01) |
| *B64D 29/00* | (2006.01) |
| *F02C 7/04* | (2006.01) |
| *F02C 7/32* | (2006.01) |
| *F04D 29/60* | (2006.01) |
| *B64D 33/02* | (2006.01) |
| *F02K 3/06* | (2006.01) |
| *F02C 7/14* | (2006.01) |
| *F04D 19/00* | (2006.01) |
| *F04D 29/02* | (2006.01) |
| *F04D 29/40* | (2006.01) |
| *F04D 29/66* | (2006.01) |
| *B64D 33/08* | (2006.01) |

(52) U.S. Cl.
CPC ........... *F04D 29/02* (2013.01); *F04D 29/403* (2013.01); *F04D 29/60* (2013.01); *F04D 29/661* (2013.01); *F28F 9/007* (2013.01); *F28F 9/0075* (2013.01); *B64D 2033/024* (2013.01); *F05D 2260/213* (2013.01); *Y02T 50/676* (2013.01)

(58) Field of Classification Search
CPC ...... F04D 29/582; F04D 29/60; F04D 29/661; F04D 19/002
See application file for complete search history.

(56) References Cited

U.S. PATENT DOCUMENTS

| | | | |
|---|---|---|---|
| 5,269,135 A | 12/1993 | Vermejan et al. | |
| 6,402,466 B1* | 6/2002 | Burdgick | F01D 9/04 277/630 |
| 8,118,548 B2* | 2/2012 | Nigmatulin | F01D 9/04 415/173.1 |
| 8,938,944 B2 | 1/2015 | Todorovic | |
| 9,051,943 B2* | 6/2015 | Elder | F02K 3/115 |
| 9,677,474 B2* | 6/2017 | Hundley, Jr. | F02C 7/12 |
| 9,765,694 B2* | 9/2017 | Storage | F02C 7/12 |
| 2007/0274829 A1* | 11/2007 | Chevrette | F16J 15/442 415/231 |
| 2009/0217671 A1* | 9/2009 | Senile | F02K 1/1223 60/771 |
| 2010/0068041 A1* | 3/2010 | Nigmatulin | F01D 9/04 415/173.1 |
| 2011/0146051 A1* | 6/2011 | Hand | F02K 1/822 29/525.01 |
| 2011/0146944 A1* | 6/2011 | Hand | F02K 1/822 165/47 |
| 2012/0285138 A1 | 11/2012 | Todorovic | |
| 2013/0011246 A1 | 1/2013 | Todorovic | |
| 2014/0027102 A1 | 1/2014 | Antel, Jr. et al. | |
| 2014/0044525 A1* | 2/2014 | Storage | F28F 3/12 415/144 |
| 2014/0241874 A1* | 8/2014 | Rioux | F01D 25/246 415/209.4 |
| 2015/0135726 A1 | 5/2015 | Hundley, Jr. et al. | |
| 2016/0201989 A1* | 7/2016 | Martinez | B23P 15/26 60/806 |

FOREIGN PATENT DOCUMENTS

| | | |
|---|---|---|
| EP | 2339144 A2 | 6/2011 |
| FR | 2990001 A1 | 11/2013 |

* cited by examiner

FAN CASING ASSEMBLIES AND METHOD OF MOUNTING A COOLER TO A FAN CASING

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

One type of heat exchanger used is a surface cooler that is mounted to an aft fan casing. However, the space in this region of the engine is limited and current designs utilize nearly all the available space. As a result, newer engine technologies, which have more heat that must be dissipated, will be thermally constrained due to the lack of space available. The problem is further exacerbated in that new engine designs are becoming further space constrained, making the size and weight of the current types of coolers and their mounting systems prohibitive.

An additional problem is that the heat exchangers are subject to relatively high temperatures that cause them to expand thermally, especially laterally or tangential, yet need to remain fixed to the engine to prevent high cycle fatigue from engine vibration. Generally, such heat exchangers are line replaceable units and require servicing while the engine is mounted to the wing of the aircraft. Thus, a mounting system that allows for ease of mounting while still allowing for thermal growth and providing the desired stability is necessary.

BRIEF DESCRIPTION OF THE INVENTION

In one aspect an embodiment of the invention relates to a fan casing assembly for a turbine engine including an annular fan casing having peripheral wall and opposing forward and aft edges and at least one fan casing fastener opening passing through the peripheral wall, an annular surface cooler having a first surface confronting the peripheral wall and having opposing forward and aft edges, with corresponding forward and aft hooks, which are radially spaced from the first surface and located between the peripheral wall and the first surface, and a mounting bracket having a body with opposing first and second flanges and at least one mounting bracket fastener opening corresponding to the fan casing fastener opening, wherein the first and second flanges underlie the corresponding forward and aft hooks, and a fastener extends through the corresponding fan casing fastener opening and mounting bracket fastener opening to retain the annular surface cooler to the annular fan casing.

In another aspect an embodiment of the invention relates to a fan casing assembly for a turbine engine including a fan casing having a peripheral wall, a surface cooler having a first surface confronting the peripheral wall and forward and aft projections, which are radially spaced from the first surface and located between the peripheral wall and the first surface, and a mounting bracket fixed to and extended from the peripheral wall and compressively retaining the forward and aft projections to mount the surface cooler to the fan casing.

In yet another aspect an embodiment of the invention relates to a method of mounting a surface cooler to a fan casing of a turbine engine, the method includes compressively retaining a hook extending from the surface cooler with a mounting bracket located between the surface cooler and the fan casing and where the mounting bracket is fixed to and extends from the fan casing.

DESCRIPTION OF EMBODIMENTS OF THE INVENTION

Embodiment disclosed herein relate to surface coolers and more particularly to systems for mounting the surface coolers in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines.

Figure 1:
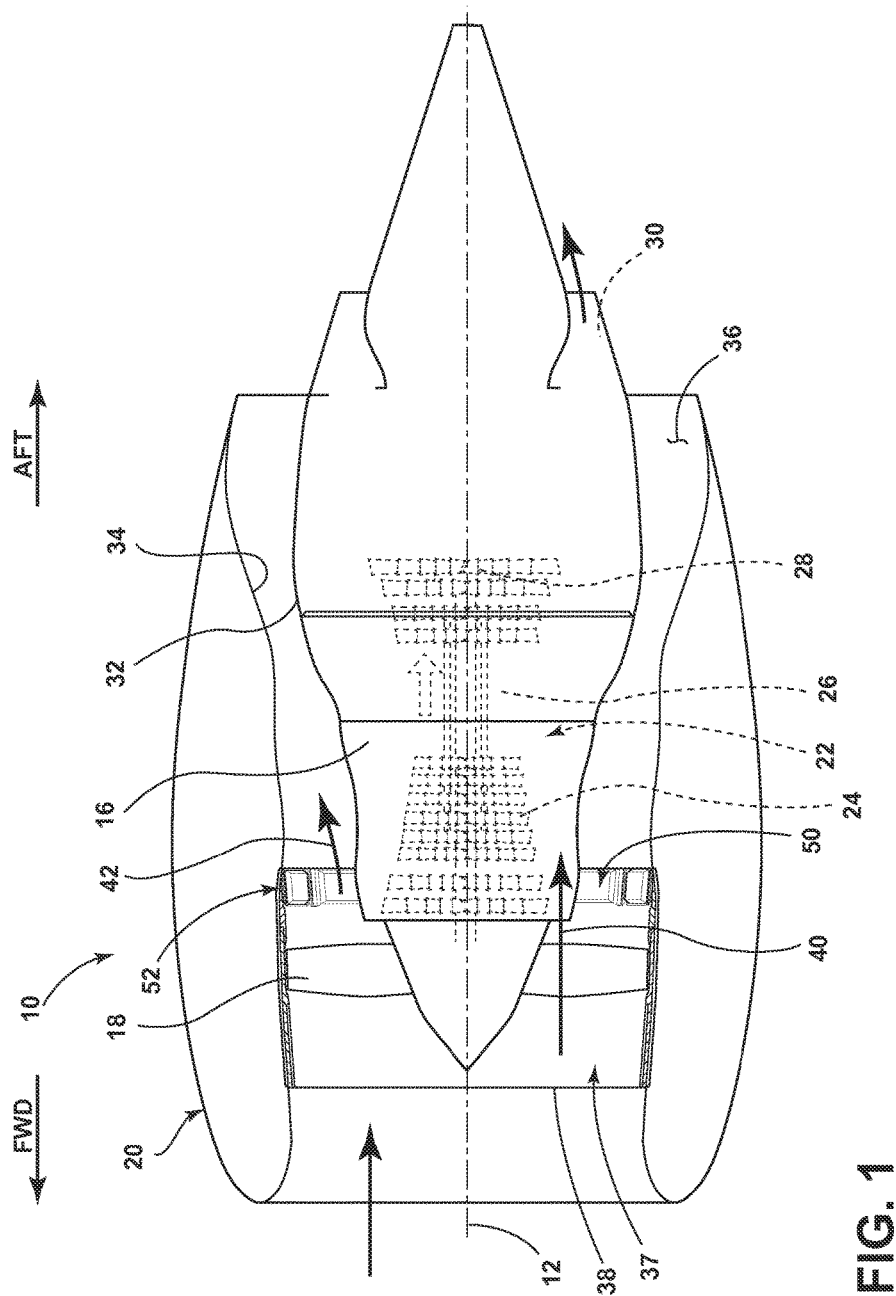
FIG. 1 is a schematic partially cut away view of a turbine engine assembly with a surface cooler and mounting system according to an embodiment of the invention.

Thus, referring to FIG. 1, a brief explanation of the environment in which embodiments of the invention can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing 37 having an annular forward casing 38 and an annular aft casing 52 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

Figure 2:
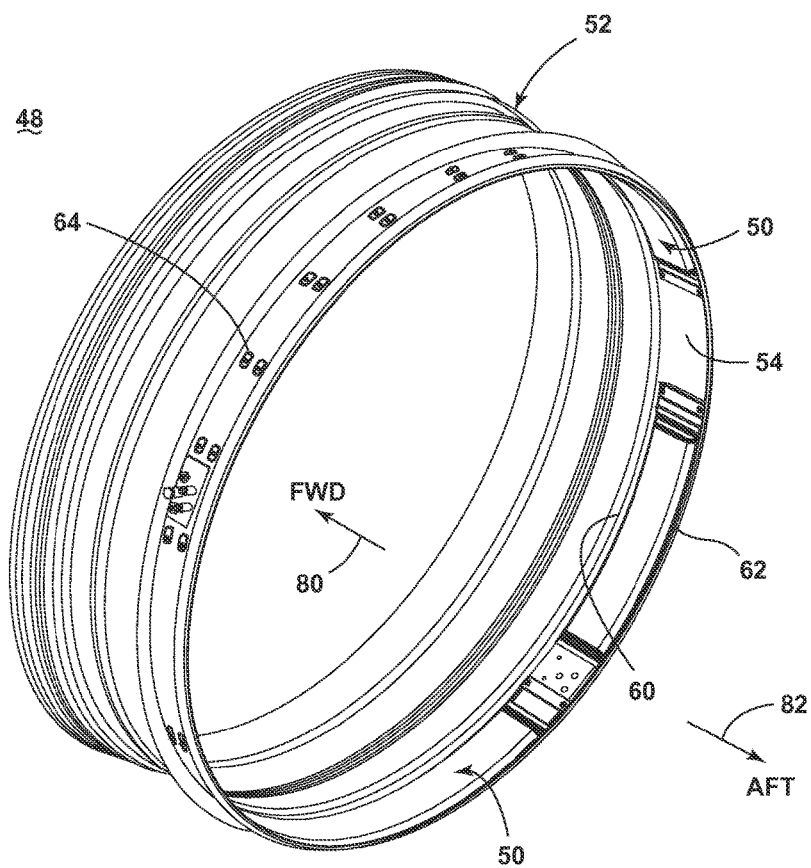
FIG. 2 is a perspective view of an aft portion of a fan casing, a surface cooler, and mount that can be included in the turbine engine assembly of FIG. 1.

The turbine engine assembly 10 can pose unique thermal management challenges and a surface cooler or surface cooler 50 can be attached to the turbine engine assembly 10 to aid in the dissipation of heat. In the exemplary embodiment, the surface cooler 50 is an annular surface cooler 50 that can be operably coupled to an annular aft casing 52 having a peripheral wall 54 (FIG. 2) that forms an interior portion of the outer cowl 34. FIG. 2 illustrates one exemplary embodiment of an aft casing 52 of the fan casing 37 (FIG. 1). The aft casing 52 includes a peripheral wall 54 as well as a forward edge 60 and an opposing aft edge 62. Fan casing fastener openings 64 pass through the peripheral wall 54 of the annular aft casing 52.

The surface cooler 50 can include, but is not limited to, an air-cooled heat exchanger that is positioned within the annular passage 36. While the surface cooler 50 has been illustrated as being downstream of the fan assembly 18 it is also contemplated that the surface cooler 50 can alternatively be upstream from fan assembly 18. As such, it will be understood that the surface cooler 50 can be positioned anywhere along the axial length of the annular passage 36. The annular aft casing 52 and surface cooler 50 can form a portion of a fan casing assembly 48.

Figure 3:
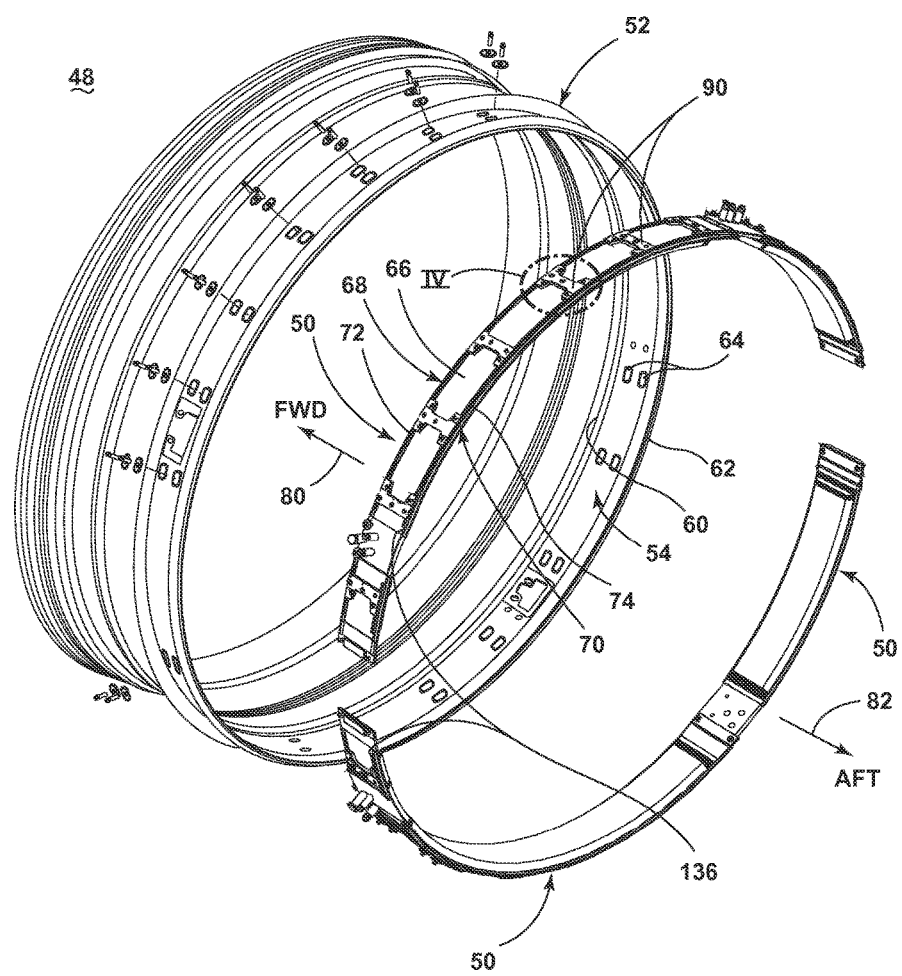
FIG. 3 is a partially exploded perspective view of the portion of the fan casing, surface cooler, and various mounting brackets of FIG. 2.

The partially exploded view of FIG. 3 better illustrates that a first surface 66 is included on the annular surface cooler 50. When assembled the first surface 66 confronts the peripheral wall 54. The first surface 66 includes a forward edge 68 and an opposing aft edge 70. The surface cooler 50 can include a circumferential and axial profile that is substantially similar to the circumferential and axial profile of the peripheral wall 54. The surface cooler 50 can cover any portion of the circumference of the peripheral wall 54. It will be understood that a set of surface coolers 50 can be utilized to cool a single turbine engine assembly 10. It will be understood that "a set" as used herein can include any number including only one.

Figure 4:
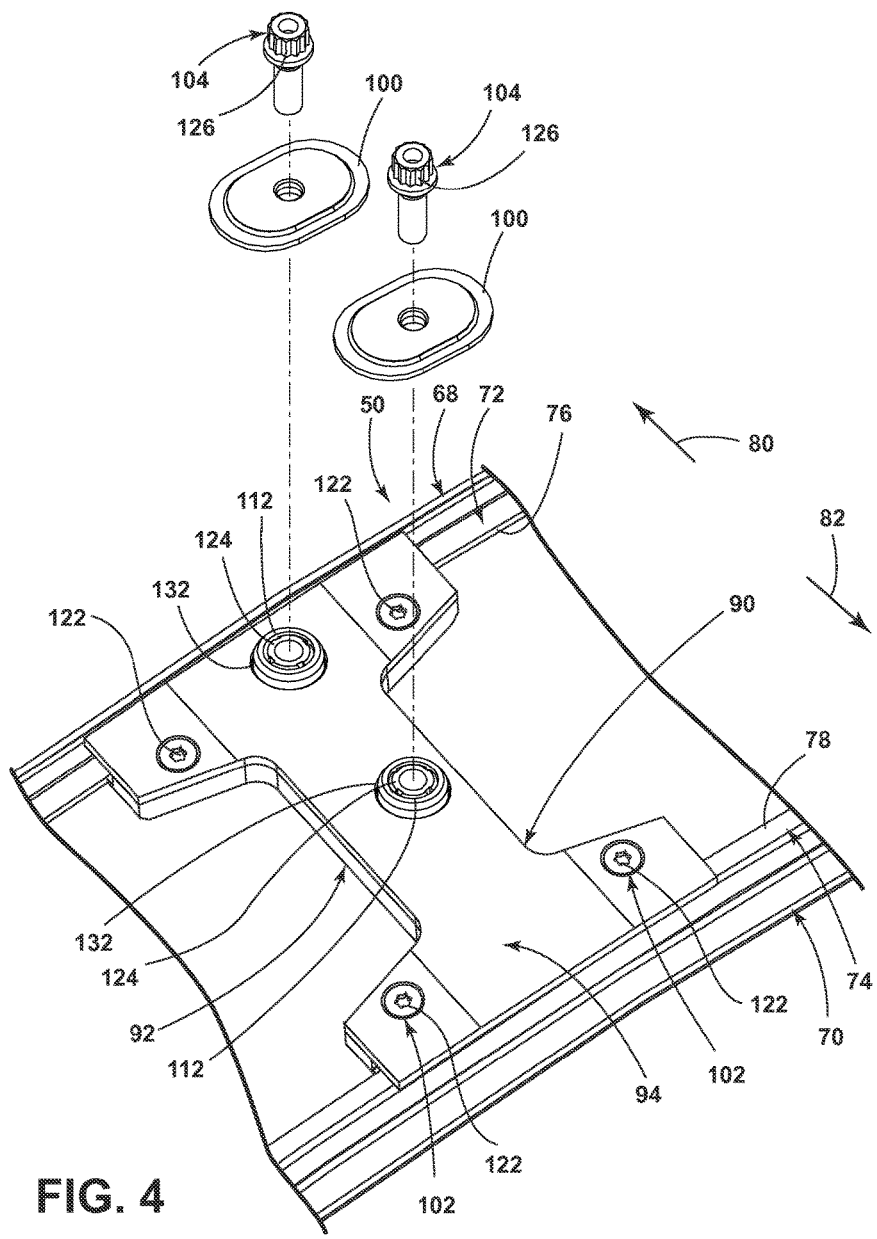
FIG. 4 is an enlarged perspective view of a portion of the surface cooler and mounting bracket of FIG. 2.
Figure 6:
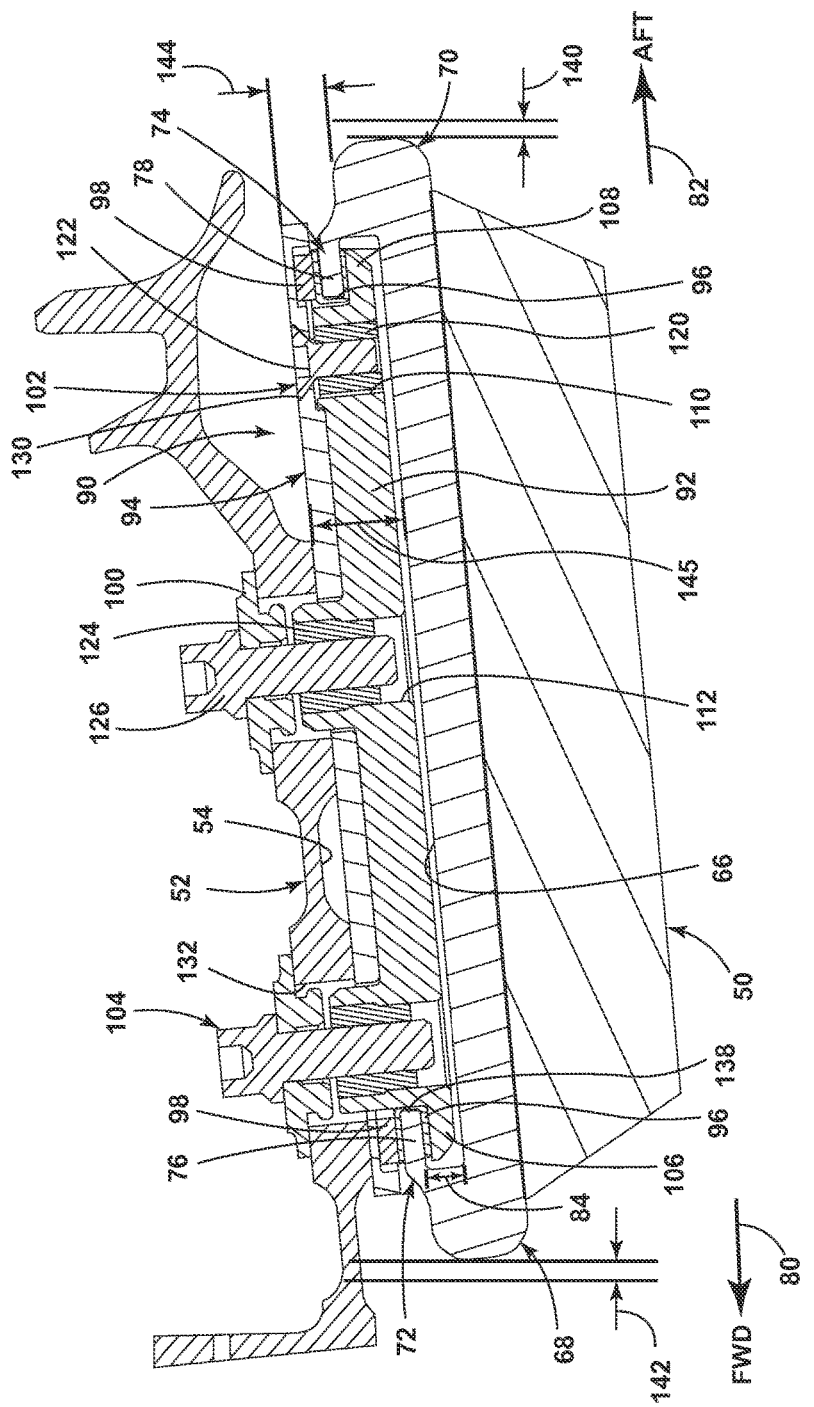
FIG. 6 is a cross-sectional view illustrating a portion of the fan casing, surface cooler, and mounting bracket of FIG. 2.

As better shown in FIG. 4, corresponding forward projections 72 and aft projections 74 are included on the opposing forward and aft edges 68 and 70, respectively, of the surface cooler 50. The forward and aft projections 72 and 74 can be shaped, formed, or contoured in any suitable manner including, but not limited to, that the forward and aft projections 72 and 74 can include forward and aft hooks 76 and 78. In the illustrated example, the aft hooks 78 extend in a forward direction, as indicated by arrow 80, and the forward hooks 76 extend in an aft direction, as indicated by arrow 82. However, this need not be the case and the forward and aft hooks 76 and 78 can be configured to extend in alternative directions. The forward and aft hooks 76 and 78 form a radial space 84 (FIG. 6) in which a portion of a mounting bracket 90 is located. A set of mounting brackets 90 can be utilized to operably couple the aft casing 52 and surface cooler 50. The mounting bracket 90 can act as a rigid constraint in dynamic loading and act as a flexible member in thermal loading. Several variations of a mounting bracket 90 were illustrated in FIG. 3 and it will be understood that the mounting bracket 90 can take any number of suitable shapes and sizes.

Figure 5:
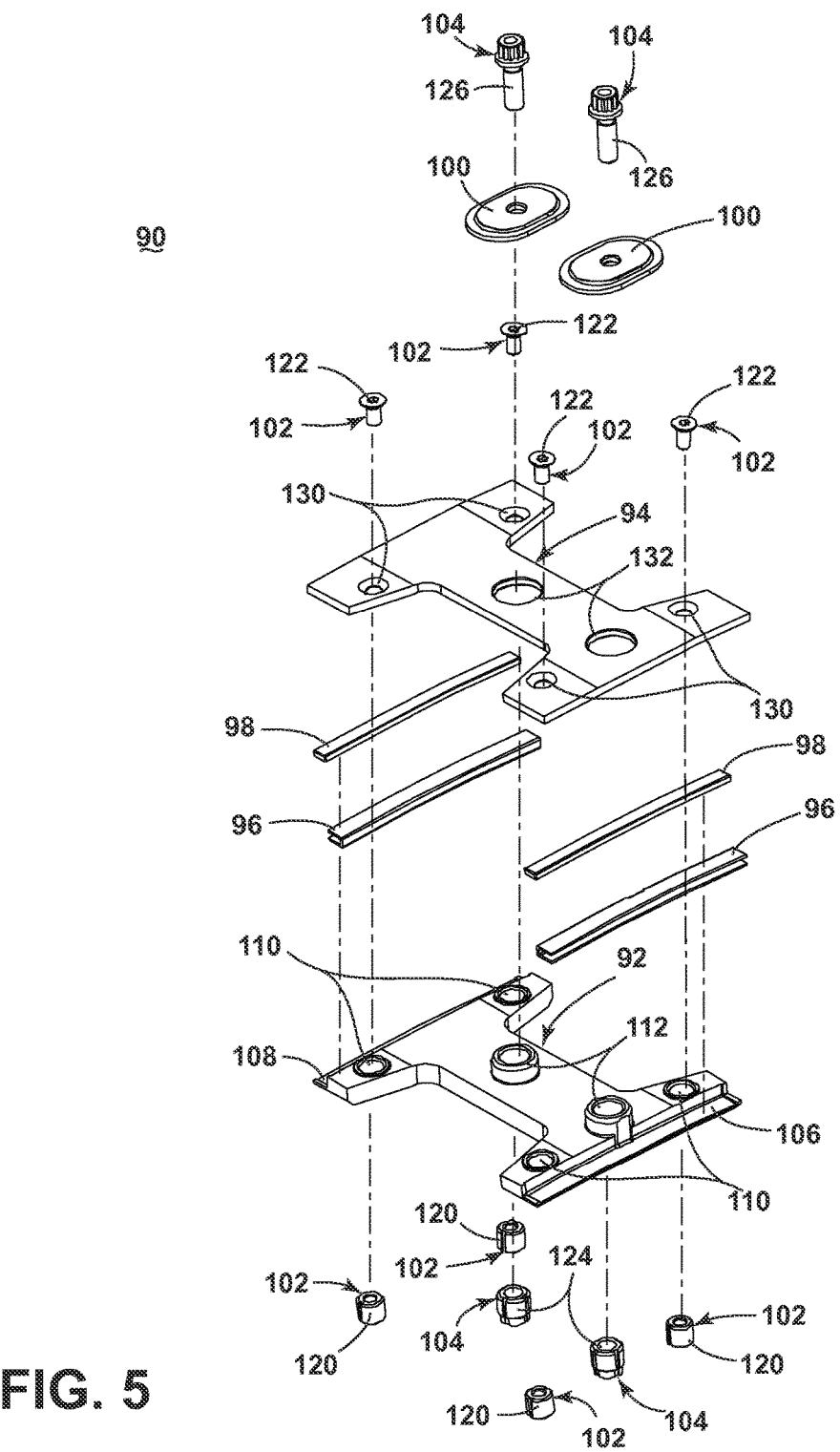
FIG. 5 is an exploded perspective view of the mounting bracket of FIG. 2.

FIG. 5 illustrates an exploded view of one of the exemplary mounting brackets 90. In the exemplary illustrated embodiment the mounting bracket 90 includes a body 92, cover plate 94, a set of wear attenuators 96, a set of vibration attenuators 98, washers 100, a first set of fasteners 102, and a second set of fasteners 104. The body 92 includes opposing first and second flanges 106 and 108. The body 92 and specifically the first and second flanges 106 and 108 are designed to engage the surface cooler 50 under the forward and aft hooks 76 and 78.

A first set of mounting bracket fastener openings 110 and a second set of mounting bracket fastener openings 112 have been illustrated as being included in the body 92. It will be understood that a single set of mounting bracket fastener openings can be included including that only one mounting bracket fastener opening can be included. The body 92 can be made from any suitable material including, but not limited to, aluminum.

The set of wear attenuators 96 can be retained by or mounted to the body 92 in any suitable manner including, but not limited to, that the set of wear attenuators 96 can be bonded to the body 92 such as through adhesive. More specifically, the wear attenuator 96 can be mounted to the body 92 at the first and second flanges 106 and 108. The wear attenuator 96 can be shaped in any suitable manner including, but not limited to, that the wear attenuator 96 can be C-shaped. The wear attenuator 96 can be made from any suitable material including, but not limited to, that the wear attenuator 96 can be a PEEK molded component.

The set of vibration attenuators 98 can be made from any suitable material including, but not limited to, that the set of vibration attenuators 98 can be formed from silicone. The set of vibration attenuators 98 can be located between the set of wear attenuators 96 and the cover plate 94. More specifically, the set of vibration attenuators 98 can be retained by or mounted to the cover plate 94 in any suitable manner including, but not limited to, that the set of vibration attenuators 98 can be bonded to the cover such as through adhesive. While both the wear attenuators 96 and the vibration attenuators 98 have been described as being bonded to the body 92 it will be understood that the mounting bracket 90 can include redundant physical features for entrapping the wear attenuators 96 and the vibration attenuators 98 in the event that the adhesive fails to bond.

The first set of fasteners 102 include threaded inserts 120 and flush head screws 122. The threaded inserts 120 can be retained within the mounting bracket fastener openings 110. Similarly, the second set of fasteners 104 include threaded inserts 124 and screws 126. The threaded inserts 124 can be retained within the mounting bracket fastener openings 112. The cover plate 94 can have a corresponding first set of openings 130 and a second set of openings 132 for receiving the flush head screws 122 and the screws 126, respectively.

During assembly, the body 92, with attached set of wear attenuators 96, can be installed through feeder slots 136 (FIG. 3) on the surface cooler 50 and can be slid circumferentially into a desired location. The wear attenuators 96 allow for sliding and less wear as the body 92 is slid to the desired location. As illustrated more clearly in FIG. 6, the forward and aft hooks 76 and 78 of the surface cooler 50 are radially spaced from the first surface 66 and the first and second flanges 106 and 108 extending from the body 92 underlie the forward and aft hooks 76 and 78. While the surface cooler 50 has been illustrated as being solid it will be understood that any suitable internal flow passages can be located therein. Thus, when assembled the wear attenuator 96 can be located between the first and second flanges 106 and 108 of the body 92 and the forward and aft hooks 76 and 78. In the case of the C-shaped wear attenuator 96, the wear attenuator 96 is located about a free end 138 of the forward hook 76 and a free end 138 of the aft hook 78.

The cover plate 94, with the attached set of vibration attenuators 98 can then be attached to the body 92 using the first set of fasteners 102. In this manner, the forward and aft hooks 76 and 78 are compressively retained between the cover plate 94 and the first and second flanges 106 and 108 of the body 92. The tightening of the flush head screws 122 preloads the set of vibration attenuators 98, which ensures complete contact between the forward and aft hooks 76 and 78 and the C-shaped wear attenuators 96. This is important for the dynamic loading conditions.

The surface cooler 50 can then be positioned such that the first surface 66 confronts the peripheral wall 54 of the aft casing 52. In such an instance, the mounting bracket fastener opening 112 of the body 92 and openings 132 of the cover plate 94 correspond to the fan casing fastener openings 64. The body 92 can then be fixed to and extended from the peripheral wall 54 by the second set of fasteners 104. In this manner, the body 92 can be suspended from the peripheral wall 54. Because the mounting bracket 90 already compressively retains the forward and aft hooks 76 and 78 this mounts the surface cooler 50 to the aft casing 52. When assembled the cover plate 94 for the mounting bracket 90 is located between the annular aft casing 52 and the body 92. Further, portions of the second set of fasteners 104 are located in a shared position between the mounting bracket 90 and within the aft casing 52.

In this manner, an embodiment of the invention can include a method of mounting the surface cooler 50 to the fan casing 37 by compressively retaining a set of hooks 76 and 78 extending from the surface cooler 50 with a mounting bracket 90 located between the surface cooler 50 and the aft casing 52. The mounting bracket 90 is fixed and extends from the aft casing 52 by way of the second set of fasteners 104. In this manner, the second set of fasteners is in a shared position between the mounting bracket 90 and the aft casing 52. While it is illustrated that the set of hooks 76 and 78 are at axial edges of the surface cooler 50 it is contemplated that they can be compressively retained at any location of the surface cooler 50.

During operation of the turbine engine assembly 10, the relative thermal delta between the surface cooler 50 and the annular aft casing 52 causes thermally-induced movement between the annular aft casing 52 and surface cooler 50. This movement can result in a relative circumferential movement between the annular aft casing 52 and annular surface cooler 50. In this manner, it will be understood that surface coolers with integrated support mechanisms have very challenging design requirements. By controlling the component dimensions by tolerance and geometrical stack, the amount of preload of the above-described embodiments is controlled to a level that results in a fixed connection for dynamic loading and floating or flexible connection for thermal loading and this is done so within a completely retained mounting bracket.

The above-described embodiments provide for a compact and simplified design that provides a variety of additional benefits including ease of assembly and that no welding is required. Further, axial length constraints and radial length constraints can be achieved. More specifically, this means that the mounting bracket as well as its threaded inserts fit between the extruded hooks and do not extend past forward and aft boundaries. Because the body and cover plate are nested around inward facing projections of the surface cooler a compact integrated design that allows for even further reduced axial footprint and reduced radial packaging can be realized. The above-described embodiments allow for extremely tight packaging in the radial and axial space provided. By way of non-limiting examples, an axial distance 140 between the forward edge 68 and adjacent hardware can be less than 0.135 inches, an axial distance 142 between the aft edge 70 and adjacent hardware can be less than 0.126 inches, and a radial distance 144 between a portion of the surface cooler 50 and portions of the peripheral wall 54 is less than 0.266 inches, while a radial distance 145 is about 0.450 inches. The radial distance 144 and radial distance 145 create a very tight radial space and the mounting bracket positions the second set of fasteners in a shared position between the mounting bracket and within the fan casing, resulting in a low radial height.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan casing assembly comprising:
an annular fan casing having a peripheral wall and a forward edge and an opposing aft edge and at least one fan casing fastener opening passing through the peripheral wall;
an annular surface cooler having a first surface confronting the peripheral wall and having a forward hook at a forward edge of the annular surface cooler and aft hook at an aft edge of the annular surface cooler, said forward hook and aft hook both extending radially from the first surface and located radially between the peripheral wall and the first surface, the aft hook extending in a forward direction and the forward hook extending in an aft direction such that the forward hook and aft hook form a radial space between the first surface and the forward hook and aft hook; and
a mounting bracket having a body with a first flange at a forward end of the body and an opposing second flange at an aft end of the body and at least one mounting bracket fastener opening aligned with the at least one fan casing fastener opening, and a cover plate located radially between the annular fan casing and the body, each of the body and the cover plate extending continuously between the forward hook and aft hook, wherein the first flange underlies the forward hook in the radial space and the second flange underlies the aft hook in the radial space, wherein the forward hook and aft hook are compressively retained between the respective first flange and second flange and the cover plate, and wherein a fastener extends through the at least one fan casing fastener opening and the at least one mounting bracket fastener opening to retain the annular surface cooler to the annular fan casing.

2. The fan casing assembly of claim 1, further comprising wear attenuators located between the first flange and forward hook, and between the second flange and aft hook.

3. The fan casing assembly of claim 2 wherein the wear attenuators include a set of C-shaped wear attenuators located about a free end of each of the forward hook and aft hook.

4. The fan casing assembly of claim 3 wherein the wear attenuators are made from PEEK.

5. The fan casing assembly of claim 1, further comprising C-shaped wear attenuators located about a free end of each of the forward hook and aft hook.

6. The fan casing assembly of claim 1, further comprising vibration attenuators located between the wear attenuators and the cover plate.

7. The fan casing assembly of claim 1 wherein the body is fixed and extended suspended from the peripheral wall by the fastener.

8. The fan casing assembly of claim 1 wherein:
a) an axial distance between the forward edge of the surface cooler and adjacent hardware is less than 0.135 inches,
b) an axial distance between the aft edge of the surface cooler and adjacent hardware is less than 0.126 inches, and
c) a radial distance between the forward and aft hooks of the surface cooler and the peripheral wall is less than 0.266 inches.

9. A fan casing assembly comprising:
an annular fan casing having a peripheral wall;
an annular surface cooler having a first surface confronting the peripheral wall, and a forward projection formed at a forward edge of the surface cooler, and an aft projection formed at an aft edge of the surface cooler, the forward projection and aft projection extending radially from the first surface forming respective end portions of the forward projection and aft projection located between the peripheral wall and the first surface, the end portion of the aft projection extending in a forward direction and the end portion of the forward projection extending in an aft direction such that the forward projection and aft projection form a radial space between the first surface and the forward projection and aft projection; and
a mounting bracket fixed to and extending from the peripheral wall and compressively retaining the forward projection and aft projection to mount the surface cooler to the fan casing;
wherein the mounting bracket further includes a cover plate and a body with a forward flange and an aft flange extending from the body, the forward flange underlying the forward projection in the radial space and the aft flange underlying the aft projection in the radial space, wherein the forward projection and aft projection are compressively retained between the respective forward flange and aft flange and the cover plate, and wherein the body and the cover plate extend continuously between the forward projection and the aft projection.

10. The fan casing assembly of claim 9, further comprising wear attenuators located between the forward flange and forward projection, and between the aft flange and the aft projection.

11. The fan casing assembly of claim 10, further comprising vibration attenuators located between the wear attenuators and the cover plate.

12. The fan casing assembly of claim 10 wherein the wear attenuators include C-shaped wear attenuators located about the respective end portions of the forward projection and aft projection.

13. The fan casing assembly of claim 9 wherein:
a) an axial distance between the forward edge of the surface cooler and adjacent hardware is less than 0.135 inches,
b) an axial distance between the aft edge of the surface cooler and adjacent hardware is less than 0.126 inches and
c) a radial distance between the forward and aft projections of the surface cooler and the peripheral wall is less than 0.266 inches.

* * * * *